United States Patent [19]

Fruchey

[11] Patent Number: 5,175,951
[45] Date of Patent: Jan. 5, 1993

[54] ILLUMINATED FISHING LURE

[75] Inventor: Russell L. Fruchey, Mentor, Ohio

[73] Assignee: Maxx Technologies, Inc., Mentor, Ohio

[21] Appl. No.: 633,418

[22] Filed: Jan. 8, 1991

[51] Int. Cl.$^5$ .......................................... A01K 85/001
[52] U.S. Cl. .................................................... 43/17.6
[58] Field of Search ........................................ 43/17.6

[56] References Cited

U.S. PATENT DOCUMENTS

| | | | |
|---|---|---|---|
| 3,308,569 | 3/1967 | Foellner | 43/17.6 |
| 3,721,033 | 3/1973 | Haynes | 43/17.6 |
| 4,175,348 | 11/1979 | Ray | 43/17.6 |
| 4,227,331 | 10/1980 | Ursrey et al. | 43/17.6 |
| 4,536,985 | 8/1985 | Caviness | 43/17.6 |
| 4,960,437 | 10/1990 | Watson | 43/42.31 |

FOREIGN PATENT DOCUMENTS 3402443 7/1985 Fed. Rep. of Germany ....... 43/17.6

Primary Examiner—Kurt C. Rowan
Attorney, Agent, or Firm—Watts, Hoffmann, Fisher & Heinke Co.

[57] ABSTRACT

A fishing lure comprising a lure body and being of a hollow construction with a predetermined configuration adopted for attracting a particular fish variety, said lure body having disposed interiorly thereof a light emitting diode (LED) and power supply means disposed interiorly of said body for energizing said light emitting diode; solid state electronic circuit means including first gate means connected to said power supply defining an oscillator coupled to said LED, and sensor means including electronic control, external sensors and a second gate means for actuating said first gate means when said electrodes are immersed in water whereby said LED is intermittently energized by said first gate means.

4 Claims, 2 Drawing Sheets

ILLUMINATED FISHING LURE

TECHNICAL FIELD

The present invention relates to the field of fishing lures, and more particularly relates to a new and improved construction for an illuminated fishing lure which is of a durable, lightweight construction having improved life while providing optimum light emitting characteristics to enhance the performance of the lure for attracting various varieties of fish.

BACKGROUND OF THE INVENTION

Heretofore, it has been known to provide various types of fishing lures having constructions designed to attract and/or stimulate fish movement and hence, maximize the fish catch. For example, various types of illuminated fishing lures have been provided which utilize a variety of light emitting sources for attracting fish. Patents typifying such prior lures are identified in the following listing:

3,040,462
4,085,538
3,721,033
4,114,305
3,950,868
4,227,331

As it will be seen, the above patents disclose fishing lures of the type which have generally employed incandescent light sources to enhance the ability to attract fish. However, it has been recognized that such lures utilizing incandescent light source materials are oftentimes subject to breakage because of the requirement to secure the incandescent material within the body of the lure. Also, it has been recognized that some type of protection or shield must be provided to encapsulate the incandescent material and/or to replace the same after extended periods of use. Accordingly, because of these difficulties, it has been a problem to provide lures that are not of a bulky and/or large size thereby reducing the number of body shapes which might otherwise be utilized for attracting a particular variety of fish. For example, the recently issued U.S. Pat. No. 4,709,499 to Ottaviano illustrates a relatively large size lure having an elongated body rather than having a "bug-like" configuration.

In the past, it has also been known to use light emitting sources in the form of light emitting diodes (LED's). Such LED designs provide advantages over the aforementioned incandescent light-type lures because of the interior location of the LED within the lure body. This interior construction has, to some extent, the difficulty of reducing the viewing angle of the LED. U.S. Pat. No. 3,950,868 is an example of such LED application.

More recently, fishing lures have been provided employing an LED light source which includes suitable circuitry to provide intermittent energization of the LED and having electronic water sensors which act as a switching mechanism to energize the LED when the lure contacts water and to de-energize the LED when the lure is removed from the water. It has been found, however, that such prior lures do not provide optimum light emitting characteristics while insuring good operating efficiencies (i.e. cost) over a prolonged periods of time.

SUMMARY OF THE INVENTION

The present invention relates to a new and improved construction for an illuminated fishing lure having a lure body made from a polymeric material and being of a hollow construction for housing an electronic circuit and power supply for the light emitting diode. The circuit is of a solid state electronic configuration including first gate means connected to a power supply defining an oscillator means coupled to the LED. Sensor means including electronic control, external electrodes and a second gate means electrically cooperate for actuating the first gate means when the electrodes are immersed in water such that the LED is intermittently energized by the first gate means.

By this construction and arrangement, there is provided a lightweight yet durable fishing lure which has substantially improved performance (i.e. life) characteristics while providing the same and/or better light emitting characteristics of prior light emitting lures for attracting various varieties of fish. In the present invention, it has been found, for example, that the lure gives a substantially improved life (i.e. at least 15:1) and at a substantially reduced cost (i.e. at least 5:1) compared to prior light emitting lures. Accordingly, in the present invention because of the substantially enhanced life characteristics, the lure can easily be discarded after one hundred (100) hours or so of usage, if desired. Because of this relatively low cost over prolonged periods of time, it is not necessary to replace the power source (i.e. battery) since the lure may simply be disposed of or used a lot without the light source, if desired. Moreover, because of the improved design and operation of the electronics, the user can experience many more hours of fishing before switching to another lure of the same type which not only provides a substantial cost savings but also allows the avid fisherman to stay with his favorite lure for an appreciably longer time.

The above and other advantages and objects of the present invention will become apparent from the accompanying drawings, the description and the appended claims.

DESCRIPTION OF THE PREFERRED EMBODIMENTS

Figure 1:
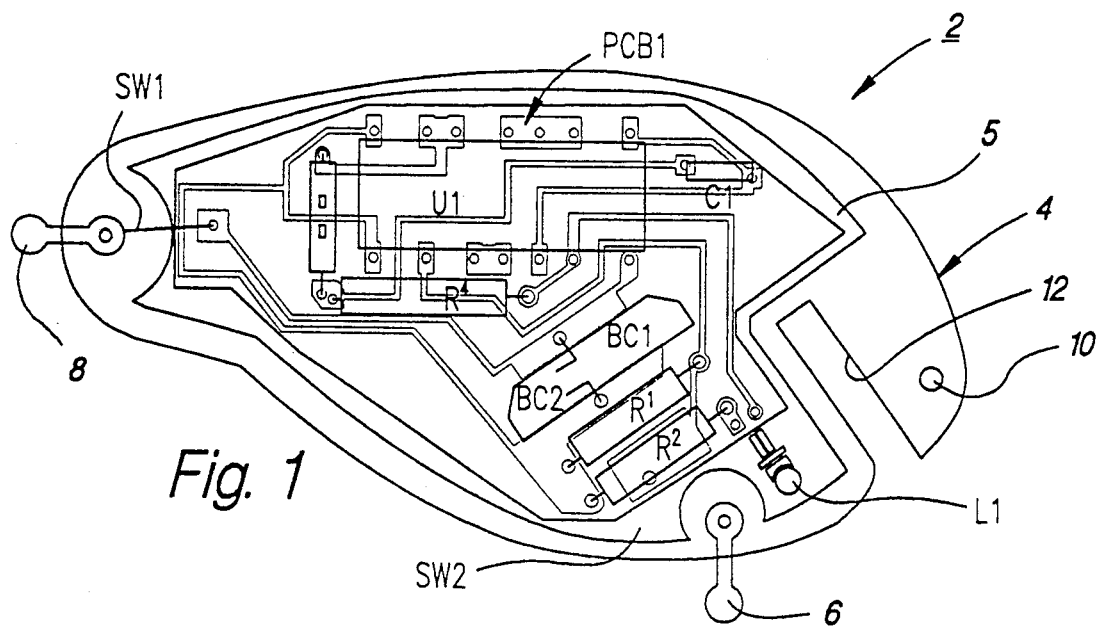
FIG. 1 is a side elevation view, with parts broken away, showing schematically the power supply and related components disposed internally of the lure body.

Referring again to the drawing and in particular to FIG. 1 thereof, there is illustrated, generally at 2, a fishing lure of the type which may be utilized in accordance with the teachings of the present invention. As shown, the lure includes a hollow body, as at 4, which may be made of a suitable synthetic material such as plastic or similar durable, lightweight material. The body may be made in two halves or shells and joined at the center to provide a hollow cavity, as at 5, to house the component parts. Fixedly attached to the body is a pair of eyelets, 6 and 8, to which may be attached suitable fishhooks (not shown) in a manner as known in the art. As known, the front eyelet 6 can be attached to a front hook, whereas, the rear eyelet 8 holds the rear hook. The eyelets act as sensors SW1 and SW2 for contact with the water to energize and de-energize the LED. The front portion of the lure body may have an eye, as at 10 (only one shown), to which a fishing lure is attached. The front of the lure includes a recess as at 12, to receive a fin or paddle (not shown) which facilitates imparting some predetermined darting or wiggling motion to the lure as it is pulled through the water to simulate an actual moving fish. Disposed internally and forwardly of the lure body generally adjacent the recess 12 is a light emitting diode (LED) designated at L1. Though the LED may be disposed internally at various locations within the lure body, it is preferred that the LED be positioned forwardly, beneath and generally parallel to the recess 12 so as to be disposed generally parallel to the paddle (not shown) and above the forward eyelet 6 so as to provide an effective viewing angle at which the LED may be observed. It is important that the LED be located below the longitudinal center line of the lure so as to direct the light downwardly.

Figure 2:
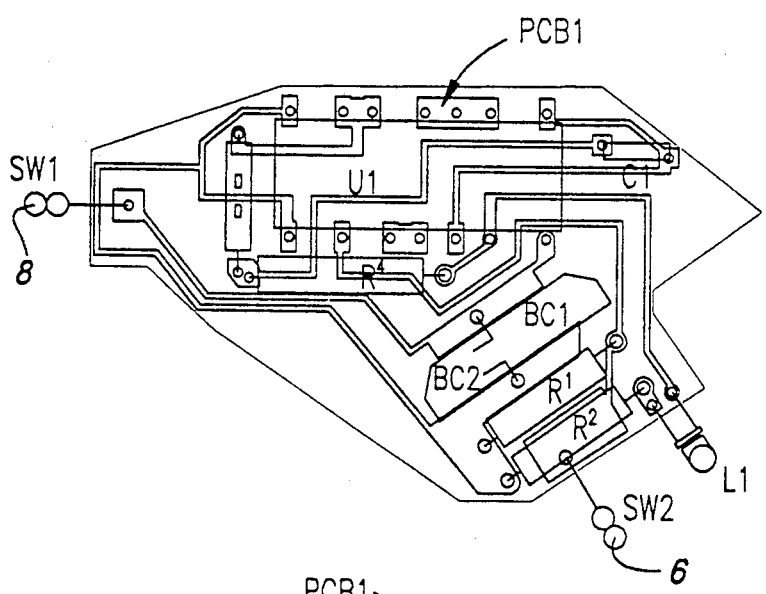
FIG. 2 is a slightly enlarged, elevation view of the lure of FIG. 1 showing schematically one form of the power supply and related components thereof.
Figure 3:
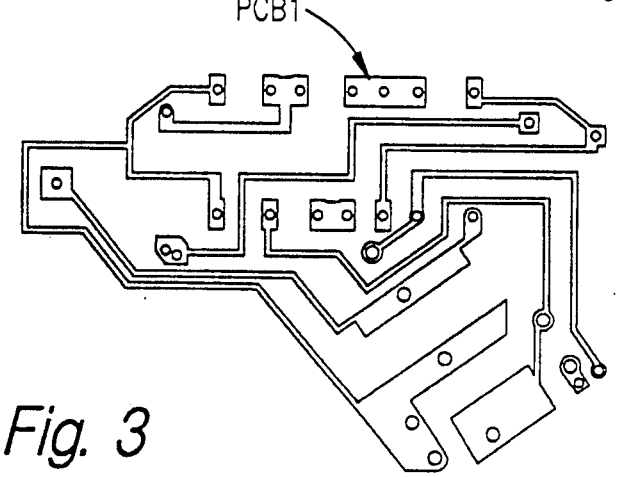
FIG. 3 is an elevation view of one form of the printed circuit for the power supply and related components illustrated in FIGS. 1 and 2 thereof.

FIGS. 1 and 2 illustrate the disposition of the various electronic components internally of the lure body 4 with the printed circuit board, being designated generally at PCB1. The printed circuit board traces are best illustrated in FIG. 3. It will be recognized that FIG. 1 is used by way of illustration and is not intended to precisely define the electrical connections of the various components for intermittently energizing the LED light source L1.

By way of illustration, representative values and appropriate descriptions of the circuit elements in conjunction with the circuit details are set forth in Table A below:

TABLE A

| Qnty | Print Value | Description |
|---|---|---|
| 1 | R1 | Resistor, 10M 1/4W 5% |
| 1 | R2 | Resistor, 330 ohm 1/4W 5% |
| 2 | R3, R4 | Resistor, 2.2M 1/4W 5% |
| 1 | C1 | Capacitor, 1uf 50VDC |
| 1 | B1 | 3V Battery, BR-1225 |
| 1 | U1 | NAND Gate, LM-74HC00 |
| 1 | PCB1 | PC Board |
| 1 | SW1 | Sense Wire |
| 1 | SW-2 | Sense Wire |
| 2 | BC1, BC2 | Battery Clips |
| 1 | L1 | LED |
| 1 | RS1 | Right Shell |
| 1 | LS1 | Left Shell |
| 2 | HR1, HR2 | Hook Ring |
| 2 | H1, H2 | Hooks |
| 1 | SP1 | Spoon |
| 1 | SPE1 | Spoon Eye |

Again referring to FIGS. 1 and 2, it will be seen that the integrated circuit is disclosed interiorly of the lure body to provide power for the LED light source L1.

Figure 4:
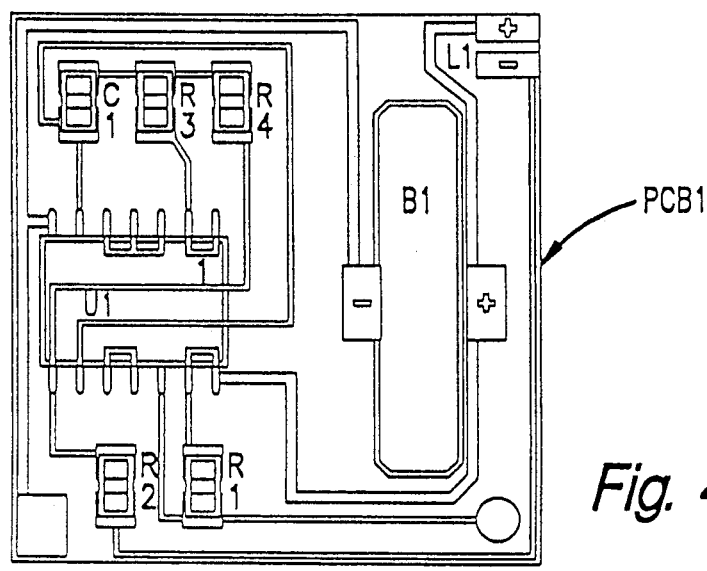
FIG. 4 is an elevation view, on an enlarged scale, showing a preferred form of the printed circuit for use in the invention; and, FIG. 5 is a schematic circuit diagram showing the power supply and related components of the electronic circuitry to energize the LED.

FIGS. 3 and 4 illustrate modified forms of the printed circuit board PCB1 with the embodiment of FIG. 4 being preferred.

Figure 5:
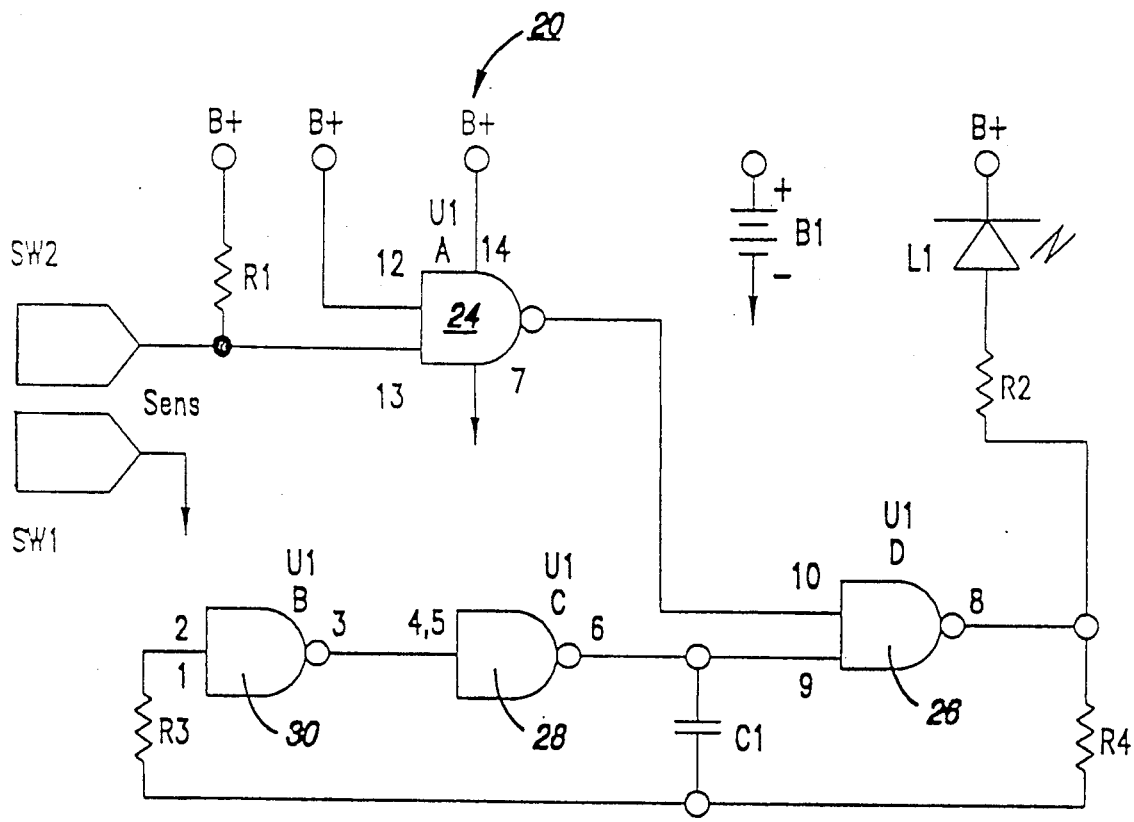

FIG. 5 illustrates the preferred embodiment of the circuit for flashing the LED L1. The circuit is preferably powered by a 3-volt button type battery indicated in the schematic by the reference character B1. The battery may be of the type designated by the type No. BR-1225 which is readily available.

The LED L1 flashes intermittently whenever the lure is immersed in water. This intermittent energization of the LED L1 is provided by a circuit that includes a water sensor portion 20 and an oscillator portion 22. The water sensor portion 20 includes the sense wires SW1, SW2. As seen in the schematic, SW1 is tied to ground, whereas, SW2 is connected to one input of a NAND Gate 24 and to the battery through a resistor R1. The other input to the NAND Gate 24 is connected to battery voltage. When the lure is out of water, the electrical path between SW2 and SW1 is interrupted and the output of the NAND Gate 24 is 0 since both inputs are essential at battery voltage. When the lure is immersed in water, the water establishes a path to ground through the sense wires SW2, SW1 which essentially drops the one NAND Gate input to ground. The unbalanced inputs cause the NAND Gate 24 to produce a high output. This high output is connected to one input of another NAND Gate 26.

The NAND Gate 26 in cooperation with inverters 28, 30 form part of a 3-gate oscillator. The frequency of oscillation is determined by the values of R3, C1 and R4 as is known. In the preferred embodiment, the NAND Gates 24, 26 are located on a single integrated CMOS chip designated as 74HC00. These integrated chips are readily available and typically include four or more NAND Gates. Accordingly, the inverters 28, 30 are formed by two NAND Gates on the same integrated circuit.

In operation, when the lure is placed in water, the NAND Gate 24 applies a high output to the upper input (as viewed in FIG. 4) of the NAND Gate 26. The lower input to the NAND Gate 26 goes high periodically. The frequency depends on the values of R3, C1 and R4. When the NAND Gate 26 goes high, the LED L1 is energized which in turn causes the capacitor C1 to discharge thus reducing the lower input to the NAND Gate 26 to substantially 0. This change in input causes the state of the NAND Gate 26 to switch. As a result, the LED L1 will flash at a fixed frequency (depending on the values of R3, C1 and R4) whenever the lure is immersed in water. Typical values for the resistors R2, R3 and R4 as well as values for the capacitor C1 are shown in Table A.

In the invention, it will be appreciated that the LED light source can have any desirable wavelength and/or color. It is important that the LED be positioned below the longitudinal center line of the lure to provide to as great an extent as possible a wide angle dispersion of the light being directed from the LED source. Orientation of the LED light source in the manner described enhances the effectiveness of the lure since it provides an optimum viewing angle of the light from the LED and hence, need not be located outwardly of the lure body as disclosed, for example, in U.S. Pat. No. 4,227,331. In the invention, it will be seen that the lure provides an improved efficiency and has a life many times greater than prior LED-type lures. Also, the lure may incorporate a noise making element such as a bee-bee or piece of shot to make a rattling sound, as known in the art.

From the foregoing description and appended claims it will be appreciated by those versed in the art that various modifications may be made to the preferred embodiment of the invention without departing from the inventive concepts recited in the appended claims. It is the purpose of the appended claims to cover all of such variations as fall within the scope of the invention.

What is claimed is:

1. A fishing lure comprising a lure body and being of a hollow construction with a predetermined configuration adopted for attracting a fish, said lure body having disposed interiorly thereof a light emitting diode and power supply means disposed interiorly of said body for energizing said light emitting diode;

solid state electronic circuit means including first gate means connected to said power supply; said first gate means including a plurality of discrete logic gates defining an oscillator electrically coupled to said LED, and sensor means including external sensors and a second gate means for actuating said first gate means when said electrodes are immersed in water whereby said LED is intermittently energized by said first gate means.

2. A lure in accordance with claim 1, wherein said lure body is made from a translucent and/or transparent plastic material capable of emitting light upon energization of said diode.

3. A lure in accordance with claim 1, wherein the first gate means includes electronic switch means for intermittently energizing said light emitting diode.

4. The fishing lure of claim 3 further comprising a capacitor electrically coupled to one input of said electronic switch means and electrically coupled to said light emitting diode for actuating said electronic switch means in response to current flowing through said light emitting diode.

* * * * *